Patented Mar. 19, 1946

2,396,679

UNITED STATES PATENT OFFICE 2,396,679

PROCESS FOR TREATING FAT-SOLUBLE VITAMIN-BEARING MATERIALS

Loran O. Buxton, Belleville, N. J., assignor to National Oil Products Company, Harrison, N. J., a corporation of New Jersey No Drawing. Application June 18, 1941, Serial No. 398,593

10 Claims. (Cl. 167—81)

This invention relates to the refining and stabilization of fat-soluble vitamin-containing materials, more particularly to the removal of undesirable tastes and odors from fat-soluble vitamin-containing oils and concentrates, and to the stabilization of said vitamin-containing materials against oxidative changes.

As is well known, fish liver oils are an excellent source of both vitamins A and D; moreover, saponification of fish liver oils and extraction of the unsaponifiable material therefrom yields fat-soluble vitamin concentrates which have found a wide variety of uses. While such products are eminently satisfactory for many purposes, they generally possess the undesirable taste and odor normally associated with products of fish origin. Fat-soluble vitamin-containing materials derived from sources other than of a fish origin also may possess undesirable tastes and odors. Many attempts have been made in an endeavor to improve the taste and odor of fat-soluble vitamin-containing materials objectionable in these respects. For example, an alkali refining method has been employed for improving the taste and odor of vitamin oils; in this method an alkali soap is prepared in the presence of the oil and then removed, the soap tending to carry with it some of the objectionable taste and odor. However, this method possesses many disadvantages, among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It is an object of this invention to provide fat-soluble vitamin-containing materials having no undesirable tastes or odors.

It is another object of this invention to provide a process for improving the taste and odor of fat-soluble vitamin-containing materials having objectionable tastes and odors.

It is a further object of this invention to provide fat-soluble vitamin-containing materials which have no undesirable tastes or odors and are also relatively stable to oxidative changes.

I have found that the undesirable tastes and odors of fat-soluble vitamin-containing materials objectionable in these respects may be substantially completely removed by heating such fat-soluble vitamin-containing materials with a crude vegetable oil at temperatures between about 100° C. and about 200° C., preferably between about 160° C. and about 180° C. The fat-soluble vitamin-containing materials may be treated in accordance with my invention by mixing the materials with the crude vegetable oil and heating the mixture at temperatures between about 100° C. and about 200° C. in an open vessel; preferably, however, the mixture is heated to the desired temperature in the presence of an inert gas and at a reduced presssure in order to minimize destruction of the vitamins and to assist in the removal of odoriferous substances. It will be found that in every case the resulting products possess substantially no undesirable tastes or odors and hence are eminently suitable for practically all purposes, particularly for human consumption; moreover, the vitamin potencies of the materials refined are not materially affected. Furthermore, I have found that the process of my invention greatly improves the stability of the fat-soluble vitamin-containing materials, as is evidenced by the fact that the peroxide numbers of these materials are substantially lowered thereby. Also, since nearly all crude vegetable oils contain natural antioxidants, varying quantities of these antioxidants are incorporated into the vitamin-bearing material during the mixing step, and thus the stability of the vitamin-bearing material is further enhanced.

Any fat-soluble vitamin-containing material of fish or animal origin having an undesirable taste and odor may be treated in accordance with my invention; thus materials containing vitamins A, D, E or K, such as, for example, cod liver oil, halibut liver oil, sword fish liver oil, tuna liver oil, shark liver oil, whale liver oil, porpoise liver oil, seal liver oil and similar oils may be treated, as well as fat-soluble vitamin-concentrates obtained, for example, by saponification of a vitamin-containing oil and extraction of the unsaponifiable material. The process of my invention is particularly applicable to the refining of vitamin A and/or D-containing oils and vitamin A and/or D concentrates of fish origin, since treatment of such materials in accordance with my invention produces products far superior to any of those now on the market. The vitamin-containing materials to be treated in accordance with my invention should not contain any foreign metals, since the presence of such metals usually accelerates deterioration of the vitamin A or D content of the oil or concentrate at the elevated temperatures employed.

The vegetable oil employed in accordance with the process of my invention may be any crude vegetable oil or mixture of such oils. It is to be understood that the term "crude vegetable oil" is used herein to connote any unrefined or partially refined oil or mixture of such oils of plant origin. It is preferred to use a crude vegetable oil containing natural antioxidants, e. g. soybean oil, wheat germ oil, corn germ oil, corn oil, wheat bran oil, oat oil, rye oil, olive oil, sesame oil, cottonseed oil, palm oil, palm kernel oil, coconut oil, rice oil, rice germ oil, linseed oil, oiticia oil, teaseed oil, perilla oil, alfalfa seed oil, celery seed oil, flax seed oil, ground nut oil, hemp seed oil, kapok oil, mustard seed oil, rape seed oil, poppy seed oil, sunflower seed oil, pumpkin seed oil, melon seed oil, peanut oil, tomato seed oil, grape seed oil, peach kernel oil, etc. However, as noted hereinabove, practically all crude vegetable oils contain some natural antioxidants.

In carrying out the process of my invention a fat-soluble vitamin-containing material having an objectionable taste and odor may be mixed with a suitable amount of crude vegetable oil and the mixture heated to a temperature between about 100° C. and about 200° C. The amount of crude vegetable oil to be used will depend upon the particular vegetable oil employed and to some extent upon the taste and odor of the vitamin-bearing material which is to be treated. Generally it may be said that an amount of crude vegetable oil between about 1% and about 10% of the weight of the vitamin-bearing material may suitably be used. The temperature at which the mixture is heated is particularly important, since I have found that at temperatures below about 100° C. the undesirable tastes and odors are not substantially completely removed from the fat-soluble vitamin-containing material. I prefer to heat the mixture to a temperature between about 160° C. and about 180° C. since at these temperatures optimum results are obtained. The temperature should preferably not exceed about 200° C., particularly if a vitamin A-containing material is being treated, since deterioration of the vitamin A is apt to commence at such temperatures.

The heating may be conducted in an open vessel if desired; however, in order to avoid the danger of deterioration of the vitamin A content of the materials treated in accordance with my invention, the heating step is preferably carried out in the presence of an inert gas such as nitrogen or carbon dioxide. Furthermore, I have found it desirable to heat the mixture at reduced pressures, preferably at pressures below about 20 mm., since under these conditions removal of the odoriferous constituents of the oil or concentrate is accelerated. The time of heating may vary to some extent; generally between about two minutes and about 1 hour, e. g. between about 5 minutes and about 15 minutes, is sufficient.

In some cases it may be found that the process of my invention, while it substantially improves the odor and taste of the fat-soluble vitamin-containing materials, also imparts thereto a color somewhat darker than that possessed by the original material. This color may be easily removed by contacting the refined vitamin-containing material with a decolorizing agent such as decolorizing carbon. If desired, the fat-soluble vitamin-containing materials may be decolorized by contact with decolorizing carbon prior to the refining process of my invention. The decolorizing treatments are preferably carried out by mixing the vitamin-containing material with a deaerated mixture of decolorizing carbon and a solvent for the material and agitating the mass in the absence of air; this process is described and claimed in my copending application Serial No. 227,599, filed August 30, 1938, now Patent No. 2,306,776.

The refined products of my invention possess very little, if any, of the objectionable taste and odor characteristic of the materials from which they are obtained; hence these products are eminently suitable for a variety of purposes and find particular application in the preparation of vitamin products for human consumption. Furthermore, extensive tests have indicated that the products of my invention have substantially lower peroxide numbers than those of the original vitamin-containing materials; this factor is of great importance since vitamin-containing materials having low peroxide numbers are much more stable than those having high peroxide numbers. Also, all of the preferred crude vegetable oils used in the process of the invention contain natural antioxidants; and during the mixing step, substantial amounts of these natural antioxidants are incorporated into the vitamin-containing material and aid in protecting it from oxidative changes. Thus it will be evident that my invention not only improves the taste and odor of the fat-soluble vitamin-containing materials, but also improves their stability.

For a fuller understanding of the nature and objects of the invention, reference should be had to the following examples which are given merely to further illustrate the invention and are not to be construed in a limiting sense, all parts being given by weight.

EXAMPLE I 50 parts of crude shark liver oil containing 105,000 U. S. P. units of vitamin A per gram were mixed with 2.5 parts of crude wheat germ oil. The mixture which possessed a distinct fishy taste and odor was completely deaerated by agitation and mild heating in the presence of nitrogen and under reduced pressure (about 1 mm.), heated to about 170° C. for 5 minutes and then cooled. The oil had lost its fishy taste, was odorless, the vitamin A content was unchanged, and the color of the oil was substantially the same as before the oil was treated.

EXAMPLE II 50 parts of partially refined shark liver oil which possessed a slight fishy taste and off-odor were treated as in Example I, the only exception being that 2.5 parts of crude corn germ oil were used in place of the crude wheat germ oil. The treated oil was completely devoid of fishiness and was light golden yellow in color. No change in the vitamin A content resulted.

EXAMPLE III 50 parts of crude shark liver oil which possessed a distinct fishy taste and odor were treated as in Example I, the only exception being that 2.5 parts of crude soybean oil were used in place of the crude wheat germ oil. The treated oil was completely devoid of fishiness, the vitamin A content was unchanged, and the color of the oil was substantially the same as before.

In order to determine the relative stability of the treated oils and of the crude oil, stability tests were run under accelerated conditions. These tests were conducted by maintaining the samples at a constant temperature of 34.5° C. in the presence of air for a number of days, and then measuring the percentage of the vitamin A destroyed. The results of these tests are as follows:

Table

| Sample | Percent vitamin A destroyed in— | | |
|---|---|---|---|
| | 6 days | 14 days | 20 days |
| Crude shark liver oil | 6.3 | 18.1 | 32.5 |
| Crude shark liver oil to which 5% of crude wheat germ oil was added and the mixture heated to 170° C | | 11.9 | 22.4 |
| Crude shark liver oil to which 5% of crude soybean oil was added and the mixture heated to 170° C | | 11.0 | 22.8 |

It will be evident from the above description that my invention provides a new and effective method of preparing fat-soluble vitamin-containing materials which have no undesirable tastes or odors and which are relatively stable to oxidative changes. My invention will, therefore, be of great interest to those engaged in the preparation of vitamin compositions, particularly for human and animal consumption.

Since certain changes in carrying out the above process and certain modifications in the compositions which embody the invention may be made without departing from its scope, it is intended that all matter contained in the above description shall be interpreted as illustrative and not in a limiting sense.

Having described my invention, what I claim as new and desire to secure by Letters Patent, is:

1. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a crude vegetable oil and heating the mixture at a temperature between 100° C. and 200° C. under a pressure of 1 to 20 mm. for a period of time sufficient to remove the objectionable tastes and odors from said vitamin-containing material.

2. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a crude vegetable oil and heating the mixture at a temperature between 160° C. and 180° C. under a pressure of 1 to 20 mm. for a period of time sufficient to remove the objectionable tastes and odors from said vitamin-containing material.

3. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a crude vegetable oil and heating the mixture at a temperature between 100° C. and 200° C. under a pressure of 1 to 20 mm. in an inert gas atmosphere for a period of time sufficient to remove the objectionable tastes and odors from said vitamin-containing material.

4. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with a crude vegetable oil and heating the mixture at a temperature between 160° C. and 180° C. under a pressure of 1 to 20 mm. in an inert gas atmosphere for a period of time sufficient to remove the objectionable tastes and odors from said vitamin-containing material.

5. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude wheat germ oil and heating the mixture at a temperature between 160° C. and 180° C. under a pressure of 1 to 20 mm. for a period of time sufficient to remove the objectionable tastes and odors from said vitamin-containing material.

6. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude corn germ oil and heating the mixture at a temperature between 160° C. and 180° C. under a pressure of 1 to 20 mm. for a period of time sufficient to remove the objectionable tastes and odors from said vitamin-containing material.

7. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude soybean oil and heating the mixture at a temperature between 160° C. and 180° C. under a pressure of 1 to 20 mm. for a period of time sufficient to remove the objectionable tastes and odors from said vitamin-containing material.

8. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude wheat germ oil and heating the mixture at a temperature between 160° C. and 180° C. under a pressure of 1 to 20 mm. in an inert gas atmosphere for a period of time sufficient to remove the objectionable tastes and odors from said vitamin-containing material.

9. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude corn germ oil and heating the mixture at a temperature between 160° C. and 180° C. under a pressure of 1 to 20 mm. in an inert gas atmosphere for a period of time sufficient to remove the objectionable tastes and odors from said vitamin-containing material.

10. A process for the removal of undesirable tastes and odors from fat-soluble vitamin-containing materials and for the stabilization of said materials against oxidative changes, which comprises mixing a fat-soluble vitamin-containing material selected from the group consisting of fish oils, fish liver oils and concentrates thereof with crude soybean oil and heating the mixture at a temperature between 160° C. and 180° C. under a pressure of 1 to 20 mm. in an inert gas atmosphere for a period of time sufficient to remove the objectionable tastes and odors from said vitamin-containing material.

LORAN O. BUXTON.